Figure 1:
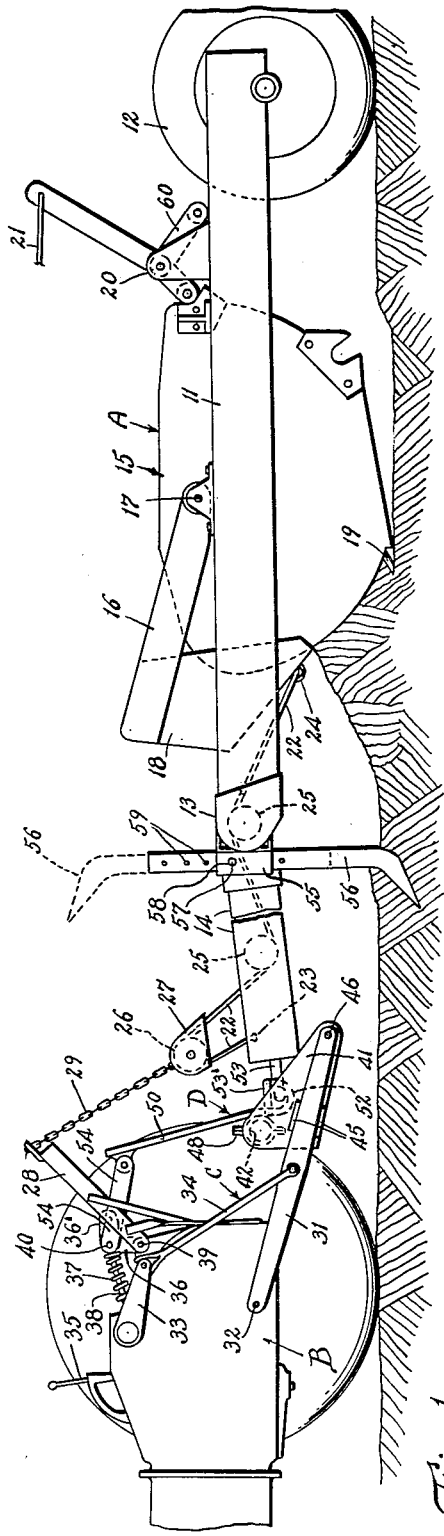

May 15, 1956 K. L. BRIMHALL 2,745,328
HITCH ATTACHMENT STRUCTURE FOR CARRY-TYPE SCRAPER
Filed Dec. 27, 1949 3 Sheets-Sheet 1

INVENTOR,
Kirk L. Brimhall
BY
AGENT.

May 15, 1956 K. L. BRIMHALL 2,745,328
HITCH ATTACHMENT STRUCTURE FOR CARRY-TYPE SCRAPER
Filed Dec. 27, 1949 3 Sheets-Sheet 2
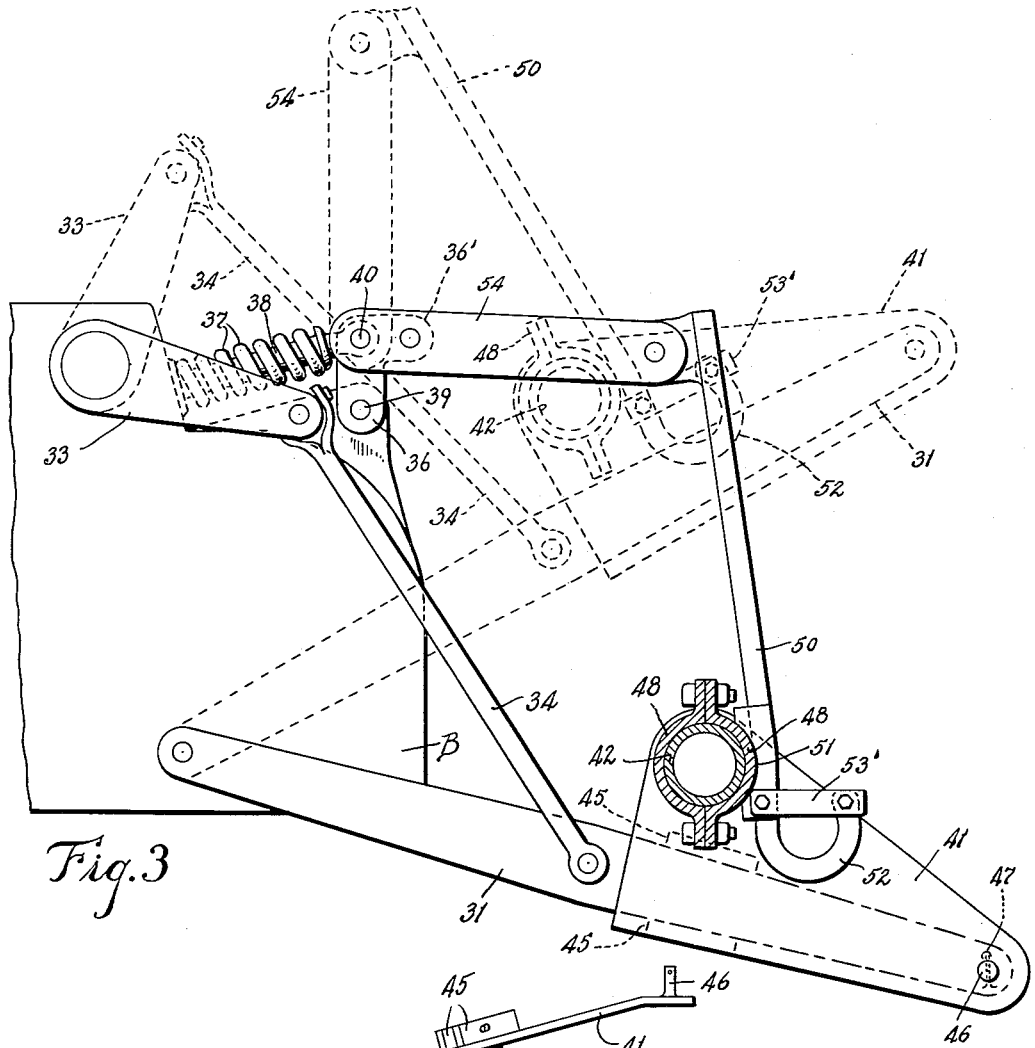
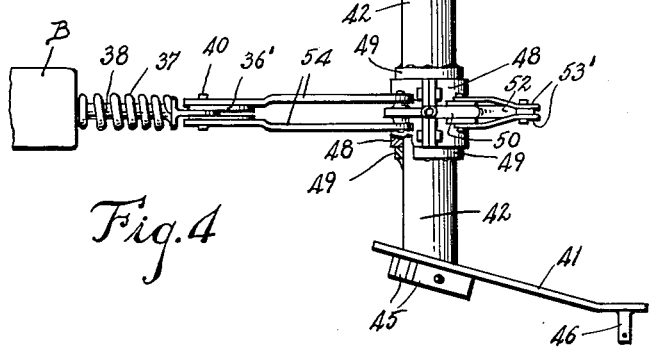
INVENTOR,
Kirk L. Brimhall
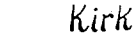
AGENT.

May 15, 1956 K. L. BRIMHALL 2,745,328
HITCH ATTACHMENT STRUCTURE FOR CARRY-TYPE SCRAPER
Filed Dec. 27, 1949 3 Sheets-Sheet 3

INVENTOR,
Kirk L. Brimhall
BY
AGENT.

United States Patent Office 2,745,328
Patented May 15, 1956

2,745,328

HITCH ATTACHMENT STRUCTURE FOR CARRY-TYPE SCRAPER

Kirk L. Brimhall, Torrance, Calif., assignor, by mesne assignments, to Western Equipment Mfg. Co., Glendale, Calif., a corporation of California Application December 27, 1949, Serial No. 135,206

3 Claims. (Cl. 97—46.07)

This invention relates to a hauling scraper wherein the scraper bowl and apron are carried by a wheeled frame adapted to be hitched to the power operated, vertically movable draft unit of a tractor for movement to dispose the bowl and apron in positions for loading, carrying, dumping, spreading, and leveling operations while the wheels of the scraper frame remain on the ground.

These power operated draft units are hydraulically operated and, in addition to a manual control, are provided with an automatic control. When a scraper or other implement hitched to the draft unit, after being set in the desired position by means of the manual control, encounters an obstruction or for any other reason imposes an excessive load on the draft unit such as would prove damaging or tend to lift the front wheels of the tractor from the ground, the automatic control will operate the draft unit to raise the implement and relieve such objectionable strains and forces, then restore the implement to the position to which it was previously set.

While these power operated units have been employed to hitch a wheeled scraper to a tractor for raising and lowering the bowl-carrying frame and to dispose the bowl in its operative positions, no provision has been made, in so far as I am aware, for making the hitch in such a manner that the automatic action of the unit will be operative as desired without using the manual control means.

Various hitches have been used for coupling ground working implements other than wheeled scrapers to draft units such as described, for example, scoops adapted to carry a load of dirt. These scoops are not wheeled supported and have a very small capacity, usually less than 1/3 (one-third) of a cubic yard, say, six or seven cubic feet. If of greater capacity, the weight of the loaded scoop when suspended at the rear end of the tractor would lift the front wheels of the tractor off the ground and possibly cause damage of the draft unit.

In order to operate a wheeled scraper properly and obtain the benefits of the automatic action of the draft unit such as described, especially a scraper having a capacity of from one cubic yard and more, a clearance of at least seven inches between the bowl and the ground should be provided when the bowl is in carrying position. Moreover the hitch should provide for carrying the loaded bowl so that the weight thereof will not lift, or tend to lift the front wheels of the tractor off the ground or cause the automatic control to operate, and should also provide for an automatic lifting of the bowl responsive to scraper-developed loads which may be occasioned when the bowl is loading or otherwise used in a manner which might develop an excessive load on the tractor.

It is therefore one of the objects of this invention to provide a hitch, for use with power operated vertically movable draft units such as described, that will automatically control the position of the cutting edge of the scraper bowl, raising said cutting edge of the scraper bowl when the developed load is too great for efficient performance of the tractor, and returning said cutting edge to the previous setting when the developed load is decreased to normal.

It is another object to provide apparatus such as described which will permit the operator to actuate the manual control to raise the wheeled frame to obtain the desired clearance between the scraper bowl and the ground of at least seven inches safely to transport the load over uneven ground and other obstructions.

It is another purpose of this invention to provide a wheeled scraper and a hitch means, such as described, which when combined with a tractor-carried power operated vertically movable draft unit, in accordance with this invention, make it possible to mount and operate ground working implements such as ripper or scarifying teeth, or a grading blade, or other ground working implements for working the ground in advance of the bowl while the latter is in various operative positions or while the bowl is disposed in a position clear of the ground. Mounted in this manner ripper teeth will prevent objectionable sliding of the bowl over uneven ground and also prevent sidewise movement of the scraper over ground which slopes across the line of travel of the scraper, thus improving the operation of the scraper, in that a better controlled operation and an effective loading of the bowl are assured in hard ground as well as in soft ground.

Due to the automatic lifting and lowering action of the tractor-carried draft unit, the teeth or other implement applied to the wheeled scraper in accordance with this invention, as well as the bowl of the scraper, will be operated at a predetermined depth of penetration of uneven ground as well as level ground.

Were it not the automatic lifting action as here employed, it would not be possible to operate a wheeled scraper of the type to which this invention relates in a safe and efficient manner unless the operator is skilled and watchful at all times as to the action of the tractor and the scraper hitched thereto. This is especially the case where a ground working implement such as a grading blade or ripper teeth are mounted on the scraper for use while the bowl is in ground-contacting positions or otherwise disposed, due to the extra load imposed on the scraper by reason of the digging action of such implements. Thus, it is apparent that a nonskilled person may operate a tractor and scraper combined in accordance with this invention, in a most efficient and safe manner.

A further purpose is to provide a hitch unit of the character described which when the bowl of the scraper hitched thereto is in ground-working position, will be operative to actuate the automatic control of the tractor carried draft unit but will be inoperative to actuate the automatic control when the bowl or any other implement on the scraper is disposed above the ground, or when the bowl is in other ground-contacting positions on ground which does not present any obstruction which would cause a scraper developed load sufficient to actuate the automatic control. This is an important provision for if the automatic control operates when the bowl is disposed in certain positions in which it is to be maintained or is to move in a predetermined manner by means of the manual control, then the manual control would be interfered with if not rendered ineffectual for desired operation of the scraper.

It should be noted that if the bowl when loaded and raised to maximum height afforded by the hitch and draft unit, should transmit a force which would actuate the automatic control, the hydraulic pump of the unit would be put in operation and as the lifting arms of the unit are not then subject to further lifting, forces are set up which may prove damaging and would interfere with the desired operation of the manual control. Consequently, the hitch means hereof in making the automatic control inoperative when the maximum lift has been obtained, will eliminate the above noted objection.

With the foregoing and other objects in view, this invention consists in the combination, relative arrangement and interrelation of the parts, elements and features shown in the accompanying drawings, described in the following specification and defined in the claims hereto appended, it being understood that the apparatus here shown and described is subject to modification with the scope of said claims.

Figure 2:
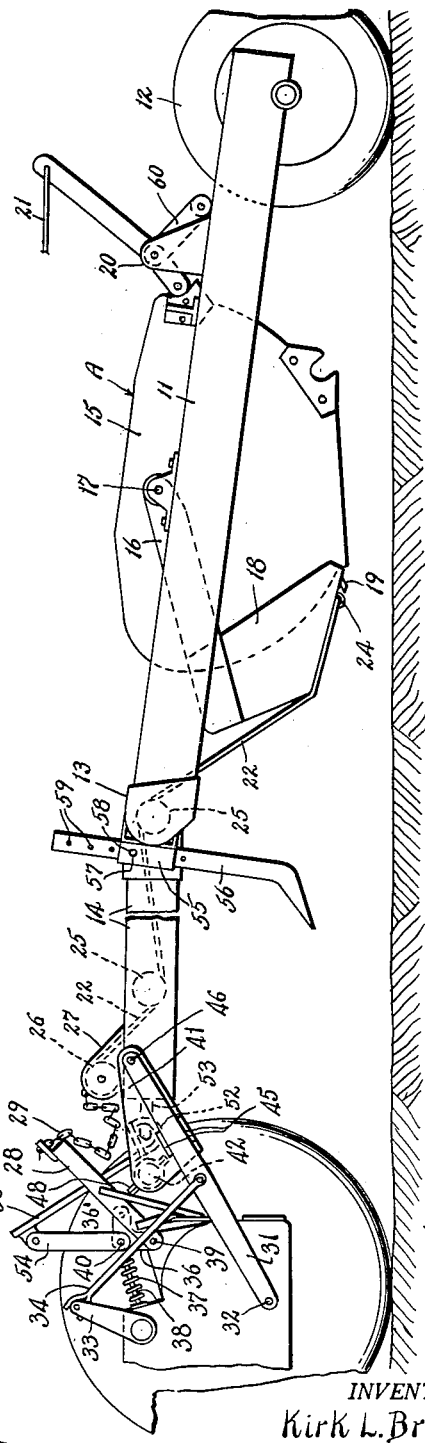
Figure 5:
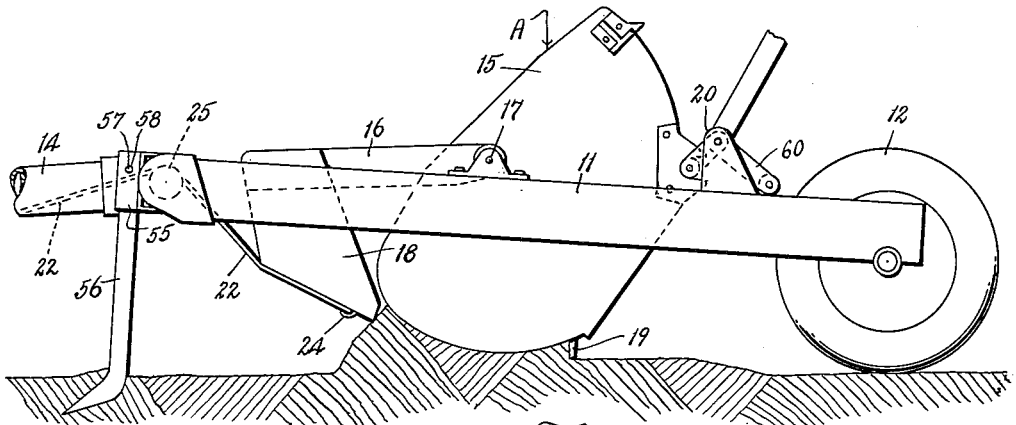
Figure 6:
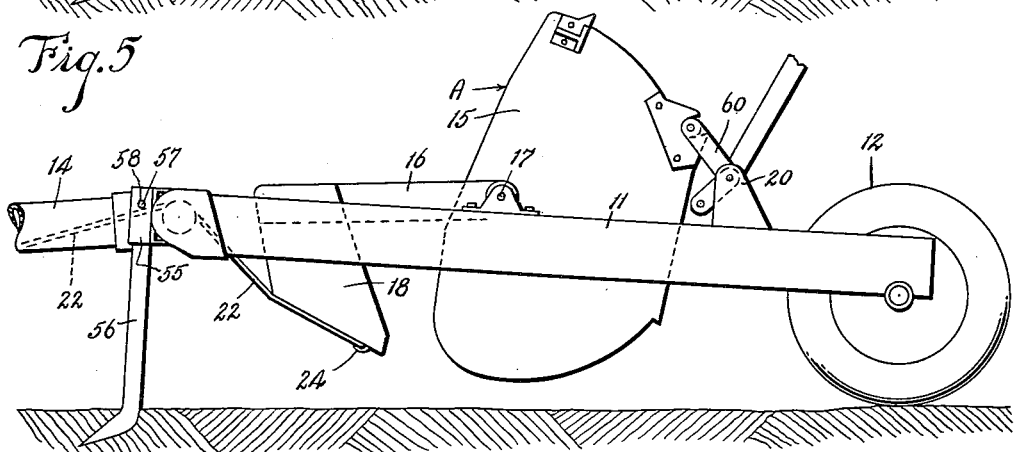
Figure 7:
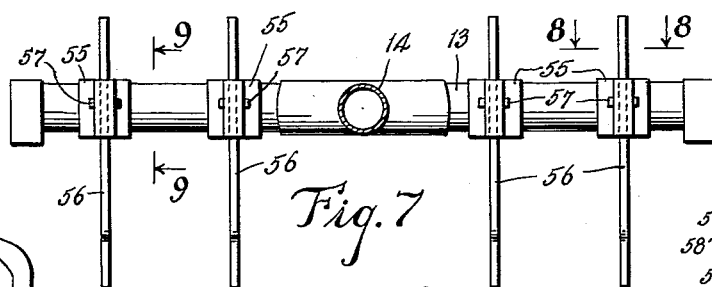
Figure 8:
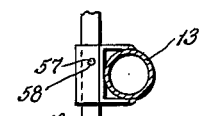
Figure 10:
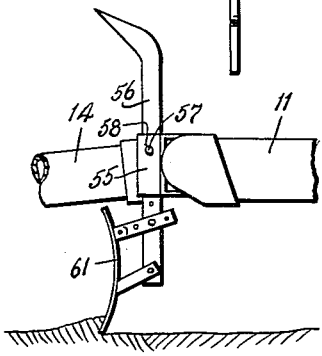
Figure 9:
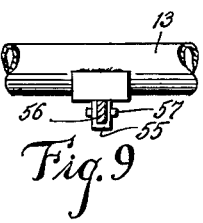

In the accompanying drawings:

Figure 1 is a fragmentary side elevational view of a wheeled scraper and apparatus associated therewith embodying this invention, shown with the scraper bowl in loading position, the ripper teeth in operative position and the scraper connected to the draft unit of a tractor by means of the hitch unit hereof, Figure 2 is a view similar to Figure 1 with the bowl and associated parts in carrying position and the ripper teeth raised above the ground, Figure 3 is an enlarged fragmentary view in side elevation and section of the hitch unit and associated parts of the draft unit of the tractor, shown in lowermost position in full lines and in uppermost position in dotted lines, Figure 4 is a top plan view of the hitch, partly in section and as connected to the automatic control rocker element of the draft unit of the tractor, but with the other parts of the draft unit removed, Figure 5 is a fragmentary elevation of the scraper with the bowl in dumping and leveling position and the ripper teeth in operative position, Figure 6 is a view similar to Figure 5 showing how the ripper teeth on the scraper may be used while the bowl is tilted back to a position with the blade of the bowl clear of the ground, Figure 7 is an end elevation of the scraper showing one way in which the teeth may be mounted on frame of the scraper, the draw bar being in section and parts behind the teeth being omitted for clarity of illustration, Figures 8 and 9 are detail sectional views taken on the lines 8—8 and 9—9 of Figure 7, and Figure 10 is a fragmentary side elevation showing how a grading blade may be attached to the teeth.

Referring to the drawings more specifically, it will be seen that one embodiment of this invention embraces a wheeled scraper A for use with a tractor B having a hydraulically operated, vertically movable draft unit C to which the scraper is coupled by means of a special hitch unit D.

As here shown, the scraper A includes a generally U-shaped frame having like side members 11 supported at their rear ends by means of wheels 12 and joined at their front ends by an end member 13 suitably welded thereto. A draw bar 14 is welded to the center of the end member 13, and provides for coupling the scraper to the draft unit C through the medium of the hitch unit D.

A bowl 15 and apron-supporting arms 16 have a common pivot 17 on the side members 11 whereby the bowl and an apron 18 carried by said arms are relatively tiltable so that the bowl may be disposed in various positions and the apron may be moved to open and close the bowl, both in a manner well known in this art.

The bowl 15 is provided with the usual blade 19 and is releasably held in tilted positions by means of a suitable latch mechanism 20 controlled by a flexible element 21 leading to the tractor.

The apron 18 is raised and lowered responsive to corresponding movement of the front end of the frame of the scraper, in a manner well known in this art. A cable 22 is fixed at one end as at 23 to the draw bar 14 and at its other end is secured to the apron as at 24. Part of the cable extends through the draw bar and end member which are tubular and have cable guiding pulleys 25 mounted thereon. A vertically moving pulley 26 is mounted in a housing 27 so that a portion of the cable is extended between the housing and the pulley and over the top of the latter in an arrangement for effecting a pull on the cable and a slackening thereof when the housing and pulley are raised and lowered. The housing 27 is connected to a bracket 28 on the tractor by means of a chain 29 which is adjustably joined to the bracket for changing the effective length thereof and regulating the extent of movement of the apron. When the bowl is in raised position the chain will be slack and the weight of the apron will keep the apron closed, but when the frame is lowered to dispose the bowl in loading position, the slack of the chain will be taken up as the pulley is lifted clear of the draw bar, thereby pulling on the cable so as to raise the apron as shown in Figure 1. On lifting the frame the chain and cable will slacken and the apron will gravitate into closed position.

The draft unit C is standard equipment of the tractor and in so far as it relates to the present invention, includes a pair of lifting arms 31 pivoted at 32 to the tractor and extending rearwardly therefrom. Crank arms 33 on the tractor and operated by the hydraulic power system thereof are connected to and operate the arms 31 by means of links 34. The operation of this system is controlled by a manual control means 35 on the tractor as well as by an automatic control means which includes a rocker member 36. A heavy spring 37 resists movement of the rocker in one direction. A rod or like member 38 is pivoted to the rocker and arranged to start and stop the hydraulic system on being reciprocated by forces applied thereto through the hitch means and by the spring 37 respectively. It is not thought necessary to further describe the hydraulic system as it is well known in this art how the system operates responsive to the manual control 35 to raise and lower the lifting arms 31. The manner in which the rocker member 36 and associated parts respond to predetermined excessive loads imposed thereon against the action of the springs 37 and operate the system to lift said arms when any ground-working implement having operative connection with the rocker member and a hitch means, develops such excessive loads, is also well known.

It is important to note that the rocker member 36 has a pivot mounting 39 at its lower end on a horizontal axis whereas the pivotal mounting 40 of the rod 38 with the rocker member is made at the upper end of the rocker so as normally to be in substantially vertical alignment with the pivot 39. Thus the upper part of the rocker must be moved forwardly against the action of the spring 37 to push the rod forward to effect an operation of the draft unit for raising the lifting arms 31.

In the standard equipment of the draft unit, a means of operative connection (not here shown) is made between a draw bar (also not shown) and the rocker member 36 so that the automatic action of the draft unit will be available. However this means of connection is not suitable for connecting a wheeled scraper of the type here shown with the draft unit, especially with the rocker member of such unit. Consequently, said means of connection and said draw bar are removed from the draft unit in order that the hitch unit of this invention may be employed for the advantageous purposes herein noted.

It should also be noted that the means of operative connection heretofore employed has been connected to the outer end of a rearwardly extended portion or arm 36' of the rocker 36 but I have found that my hitch means should be connected to the pivot 40 in order that the desired manual and automatic control may be had for a wheeled scraper of the type here shown as otherwise the rocker will be moved and cause an automatic lifting action at times when such lifting is not desired.

The hitch means D as here provided includes elongated side members 41 in the form of heavy plates to which are welded a tubular cross member 42 forming with the side members the base of the hitch. The side members 41 are adapted to be attachably mounted in edgewise position on the lifting arms 31 by means of lugs 45 and pins 46 fixed on the sides of the members 41 adjacent the ends of said members. The pins 46 extend through openings in the ends of the arms 31 and are held in place by removable fastenings 47. The side members 41 are wider at the ends thereof where the lugs 45 are located, and as these members are disposed edgewise, the forward or inner ends thereof extend well above the plane of the arm 31 and are disposed a point intermediate the ends of said arms. The tubular cross member 42 is fixed to the wider ends of the side member 41 so as to be disposed well above the plane of the arms 31 as shown in Figures 1, 2 and 3.

A split sleeve or collar 48 is rotatably supported on the tubular cross member 42 between stop rings 49 welded on the cross member and serves as a fulcrum and support for an upright draft lever 50 which is welded as at 51 between its ends to the rear half of the split sleeve 48 as best shown in Figure 3. The major portion of the lever 50 is extended above the fulcrum point and the remainder terminates at a point below the fulcrum in the form of an upwardly opening hook portion 52 arranged to hook through an eye 53 on the outer end of the draw bar 14 of the scraper. A pair of arms 53' pivoted on the sleeve 48 are adapted to be fastened as shown in Figure 3 to the hook portion 52 so as to prevent disengagement of the hook from said eye.

A link 54 is pivoted at one end to the upper end of the draft lever 50 and at its other end is formed so as to be pivoted on the pivot 40 of the rocker 36, said link being as here shown, of doubled form so that the ends thereof will straddle the rocker and lever 50 respectively.

With reference to Figure 3, it will be seen that the link 54, lever 50 and rocker 36 are so related that when the lifting arms 31 of the draft unit C are in uppermost position, the link is disposed in substantially vertical alignment with the pivots 39 and 40 of the rocker member. In the horizontal position, the link 54 will be operative to move the rocker 36 forwardly and start the lifting operation of the draft unit should the scraper develop an excessive load during a loading or other ground working operation of the bowl or other implement on the scraper. However, when the link 54 is in upright or vertical position, it will be ineffective to operate the rocker 36 to start the lifting action as well as apparent with reference to Figure 3.

Assuming that the bowl 15 has been set in a loading position as shown in Figure 1, through appropriate manipulation of the manual control 35, and that during the loading operation the bowl encounters an obstruction, the resultant excessive load will rock the lever 50 so that through the link 54 the rocker member 36 will rock forwardly on pivot 39 against the action of the heavy spring 37 and push the rod 38 whereby the hydraulic system will lift the arms 31. This lifting of the arms 31, raises the scraper and the bowl thereon, thereby relieving the excessive load and preventing damage of the scraper, the hitch unit and the draft unit of the tractor also prevents the front wheels of the tractor from lifting off the ground. As soon as this excessive load is relieved, the spring 37 returns the rod 38 and associated parts to normal position and the system then functions to allow the scraper frame to return to the loading position into which it was set.

When the bowl is disposed in positions clear of the ground, the draft lever 50 and link 54 are so related to one another and the rocker member 36 that loads imposed on the lever by the scraper will be ineffective to rock the rocker member. This prevents an automatic lifting action of the hydraulically operated draft unit and consequent interference with the manual control means thereby assuring a safe carrying of the load in the bowl.

It is important to note that my improved hitch unit is disposed above the plane of the lifting arms 31 of the draft unit, that is, the fulcrum for the draft lever is above the plane of said arms, with the hook end 52 of the lever adjacent the plane of said arms that is here shown.

Due to this arrangement, the scraper frame is coupled to the tractor so that it may be lifted to a height giving a clearance of the bowl above the ground of more than the required 7 inches, thereby assuring a proper load carrying operation over uneven ground and obstructions on the ground.

As the particular hitch unit D hereof makes it possible safely and effectively to operate a wheeled scraper of the type here shown, subject to the automatic control of the tractor-carried hydraulically operated draft unit C, I find that I am able to attach ground-working implements to the scraper for a safe and efficient operation at the same time as the bowl is operated or independently thereof. Accordingly, I have provided sockets 55 welded or otherwise fixed on the end member 13 of the scraper frame for reception of the shanks of ripper teeth 56. A pin or bolt 57 is inserted through opening 58 and 59 in the sockets and shanks of the teeth respectively for holding the teeth in the sockets. The several vertically spaced openings 59 in the shanks of the teeth make it possible to adjust the teeth to vary the depth of penetration of the ground in ripping operations, best to suit the nature of the particular ground being worked, and the particular ground-working position of the bowl. In this connection, it should be noted that the several teeth 56, there being four in a row across the frame, in front of the bowl in the present instance, may be employed for ripping and loosening the ground in advance of the bowl as shown in Figure 1, while the bowl is being loaded. This use of the teeth will prevent objectionable sliding of the bowl over uneven ground and will assure a more effective scraping and loading action of the bowl and an increased loading thereof in soft or hard ground, thereby increasing the efficiency of the scraper.

If desired, the ripper teeth may be used as shown in Figure 5, while the bowl is positioned for dumping or leveling operations, or may be used as shown in Figure 6, with the bowl tilted back to a position with the scraper blade clear of the ground. The bowl is held in this position by means of pivoted chock members 60 which are moved by hand into and out of operative position.

Figure 10 shows how a grading blade 61 may be attached to the teeth for use with the scraper. If the use of the teeth is not desired, they may be readily removed or placed in an inverted and out-of-the way position in the socket therefore as shown in dotted lines in Figure 1.

Due to the provision for adjustably mounting the teeth in the sockets and the fact that they are raised and lowered with the scraper frame at the will of the operator of the tractor, it is seen that a controlled ripping operation of the teeth as desired may be had while the bowl is in ground working position or while raised above the ground.

Were it not for the automatic lifting and strain-relieving action of the tractor-carried draft unit as provided through use of my improved hitch, it would not be possible safely to use the ripper teeth in the manner here provided on a wheeled scraper, as otherwise the load on the tractor would be excessive and tend to lift the front end thereof or possibly damage the teeth, the scraper, or the draft unit.

I claim:

1. A hitch unit for coupling a ground working implement to a vertically movable, power-operated draft unit of a tractor, said draft unit including a pair of lifting arms having outer ends disposed rearwardly of the tractor, and a control member connected in the draft unit to raise and lower said lifting arms responsive to predetermined loads imposed thereon; said hitch unit comprising: a pair of elongated side members; a cross member fixed at its ends to said side members adjacent corresponding ends of said side members; means on said side members for detachably mounting said side members on said lifting arms with said cross member and said corresponding ends disposed above said arms and in inwardly spaced relation to said outer ends of said arms; a draft lever fulcrumed on said cross member with one end disposed below said cross member and in inwardly spaced relation to said outer ends of said arms; means on said one end of said lever operable for effecting a draft connection with a ground-working implement; a link connected at one end with the other end of said lever; and means on the other end of said link providing for connection of the link with said control member.

2. A hitch unit for coupling a ground working implement to a vertically movable, power-operated draft unit of a tractor, said draft unit including a pair of lifting arms having outer ends disposed rearwardly of the tractor, and a control member connected in the draft unit to raise and lower said lifting arms responsive to predetermined loads imposed thereon; said hitch unit comprising: a pair of elongated side members; a cross member fixed at its ends to said side members adjacent corresponding ends of said side members; means on said side members for detachably mounting said side members on said lifting arms with said cross member and said corresponding ends disposed above said arms and in inwardly spaced relation to said outer ends of said arms; said mounting means including members on the other corresponding ends of said side members engageable with said outer ends of said arms, and lugs on said side members below said cross member arranged to embrace said lifting arms; a draft lever fulcrumed on said cross member; means on one end of said draft lever disposed below said cross member and inwardly from said outer ends for effecting a draft connection with a ground working implement; a link connected with the other end of said lever; and means on said link for connecting the link with said control member.

3. A hitch unit for coupling a ground working implement to a vertically movable, power-operated draft unit of a tractor, said draft unit including a pair of lifting arms having outer ends disposed rearwardly of the tractor and a control member connected in the draft unit to raise and lower said lifting arms responsive to predetermined loads imposed thereon; said hitch unit comprising: a pair of elongated mounting plates; each plate having greater width at one end; a rigid cross member fixed at its end to the wider ends of said plate; members adjacent the other ends of said plates for securing said plates to said arms with said wider ends of said plates disposed in inwardly spaced relation to said outer ends of said arm and with said cross member disposed above said arms; a draft lever fulcrumed between its ends on said cross member at a point substantially centrally of the ends of said cross member; means on said draft lever below said cross member and inwardly spaced from the outer ends of said arms for effecting a draft connection with a ground-working implement; and means on said lever for effecting an operative connection of said lever with said control member.

References Cited in the file of this patent

UNITED STATES PATENTS

| | | |
|---|---|---|
| 871,976 | Whitney | Nov. 26, 1907 |
| 2,311,639 | Click | Feb. 23, 1943 |
| 2,321,516 | Robinson | June 8, 1943 |
| 2,341,807 | Olmstead et al. | Feb. 15, 1944 |
| 2,347,898 | Ferguson | May 2, 1944 |
| 2,386,192 | Brimhall | Oct. 9, 1945 |
| 2,405,980 | Sands et al. | Aug. 20, 1946 |
| 2,437,875 | Chambers et al. | Mar. 16, 1948 |
| 2,453,723 | Palmer et al. | Nov. 16, 1948 |
| 2,455,727 | Bunting | Dec. 7, 1948 |
| 2,482,657 | Court | Sept. 20, 1949 |
| 2,514,091 | Renauld | July 4, 1950 |
| 2,638,045 | Heitshu | May 12, 1953 |